United States Patent [19]

Singer et al.

[11] Patent Number: 5,100,683
[45] Date of Patent: Mar. 31, 1992

[54] METHOD AND APPARATUS FOR COMBINED PRODUCT COATING AND DRYING

[75] Inventors: Roy E. Singer, Crystal, Minn.; Gerald E. Schmelzle, Sabetha, Kans.

[73] Assignee: Wenger Manufacturing, Sabetha, Kans.

[21] Appl. No.: 658,710

[22] Filed: Feb. 21, 1991

[51] Int. Cl.[5] .................. A23G 3/00; F26B 11/00
[52] U.S. Cl. .................. 426/302; 118/19; 118/20; 118/303; 426/304; 426/305
[58] Field of Search .............. 426/302, 304, 305; 118/16, 19, 20, 24, 303, 23

[56] References Cited

U.S. PATENT DOCUMENTS

| | | | |
|---|---|---|---|
| 3,167,035 | 1/1965 | Benson | 118/20 |
| 3,955,529 | 5/1976 | Reed | 118/19 |
| 4,581,242 | 4/1986 | Forster | 118/20 |
| 4,961,274 | 10/1990 | Coffman | 118/20 |

FOREIGN PATENT DOCUMENTS

2502466 10/1982 France .................. 118/19

Primary Examiner—George Yeung
Attorney, Agent, or Firm—Hovey, Williams, Timmons & Collins

[57] ABSTRACT

An apparatus for drying and coating a food product is provided which enables a uniform coating to be sprayed on the product without adversely affecting the product moisture content. The apparatus includes a reel which includes at least one and preferably a series of perforate zones in the sidewall for circulating air around the product during passage of the product therealong. Spray nozzles are arranged at intervals along the reel to deposit sugar, salt or other food coatings in slurry form on the food product. The reel rotates during coating and drying of the product to prevent aggregation of the individual food products and uneven coating, as well as providing for uniform drying of the coated product. The invention includes a method of drying and coating a food product including the steps of introducing the food product into a reel inlet, rotating the reel and circulating air therethrough, applying a coating to the product during rotation of the reel and drying the coating on the product before discharging the coated product from the dryer.

8 Claims, 5 Drawing Sheets

METHOD AND APPARATUS FOR COMBINED PRODUCT COATING AND DRYING

BACKGROUND OF THE INVENTION

1. Field of the Invention

This invention concerns a method and apparatus for applying a uniform substance coating to a food product which advantageously enables the product to retain a low moisture content for better storage and reduction of drying costs. The food product is advanced through a rotatable reel to agitate and expose the product to sprayed-on coatings in conjunction with circulating and heating air.

2. Description of the Prior Art

A number of different food products are produced by commercial methods which require drying prior to storage. Moisture levels in the product must be kept low to prevent product degradation during the period from manufacture to ultimate consumption. Thus, in the case of many types of products such as breakfast cereals and snack foods which are conventionally prepared by extrusion cooking, the moisture content must be reduced prior to packaging and subsequent storage.

It may be desirable to produce a product which is provided with a surface coating of a different substance. For example, the consumer may desire a breakfast cereal which has a sugar coating, flavored coating, or a snack food such as a puffed cheese-flavored item which has a salt coating. These materials have conventionally been added to the product in separate machines located downstream from the product dryer. The coatings have often been applied through what is known as a piccolo tube where the coating is dripped onto the product.

These prior art machines and methods have had difficulty in achieving uniform product coatings and have had the further disadvantage that the product has a tendency to aggregate into clumps which are unsalable. Perhaps a more serious problem is the moisture added to the product during the coating process which may adversely affect the product by sealing in the added moisture when the moisture of the coating is absorbed by the dried product and the surface coating is dried. These processes have not adequately agitated the product during dripping of the coatings with the result that certain shapes, such as toroids ("O's"), are unevenly coated.

SUMMARY OF THE INVENTION

These and other problems are largely solved by the combined product coating and drying apparatus of the present invention and the associated method. The apparatus hereof advantageously provides for drying the product after coating it with a substance such as sugar flavored slurry or salt which is sprayed on and then dried during rotation of a product-conveying reel. The reel is rotatable and permits the circulation of drying air therethrough to yield a uniformly coated, dried product in a single operation and occupying a minimum of floor space.

The apparatus hereof broadly includes a combined dryer and spray unit which includes an axially rotatable reel provided with a perforate sidewall. At least one spray station is located interiorly of the sidewall to direct a slurry containing the desired coating substance onto the product as it passes through the rotating reel. The product is presented as a tumbling bed which is agitated as it passes through the reel with drying air circulated therearound. The reel may be inclined to allow gravity to gradually cause the product to advance from an inlet to an outlet and then discharged.

In preferred forms, a plurality of separate, longitudinally spaced spray zones are defined within the reel, each zone including at least one spray nozzle for directing a spray of coating substance onto the tumbling bed. A housing surrounds the reel and includes a heat exchanger for heating the air and a circulating fan for forcing air through the perforations in the sidewalls of the reel. The housing is advantageously configured to draw additional air through openings at each end of the reel whereby both fresh and recirculated air is introduced into the reel. A secondary discharge fan is associated with an outlet duct for removing moisture-laden air from the apparatus.

The combination product coating and drying apparatus is preferably divided into a plurality of separate drying and spraying zones corresponding to perforate and imperforate regions of the reel sidewall. The drying zones include a plurality of perforations sized to permit the passage of air therethrough but not to permit the passage of product. Each spraying zone is preferably imperforate to reduce the loss of sprayed product coating through any perforations and to provide for thorough coating of the product with the sprayed substance. A nozzle is directed toward the bed of product in each spray zone to supply a pressurized spray of the desired coating substance in a liquid slurry so that all surfaces will be evenly coated, and to enable a series of thin coats to be applied, thereby avoiding excessive moisture absorption by the product. The final product moves out of the reel and onto a screen whereby the few oversized individual products and aggregations may be retained while normal product is discharged therethrough.

The invention hereof advantageously includes a method of coating and drying a product by first introducing the product into a rotating reel having a plurality of perforations in its sidewall for the circulation of air therethrough. The reel is rotated to advance and agitate the product. Air is circulated through the reel to dry the product passing therethrough. Thereafter, at least one spray nozzle directs a coating substance onto the product during rotation of the reel and the coating substance is dried before it is discharged from the unit.

DESCRIPTION OF THE PREFERRED EMBODIMENT

Referring now to the drawing, a combined product coating and drying apparatus 10 broadly includes a housing 12, rotatable reel 14, and drive mechanism 16 for rotating reel 14. A sizing screen 18 is connected to the reel 14 for rotation therewith, and an inlet chute 20 is located opposite the sizing screen 18 for introducing food product into the reel 14. An air circulation component 22 is located atop the housing 12 and a spray unit 24 is positioned for introducing a coating substance onto the food product moving along the reel 14. A series of support members 26 adjustably support the housing 12 for varying the angle of inclination of the reel 14. In the drawing, FIG. 5, arrows are used to show the direction of air flow through the apparatus 10.

Figure 1:
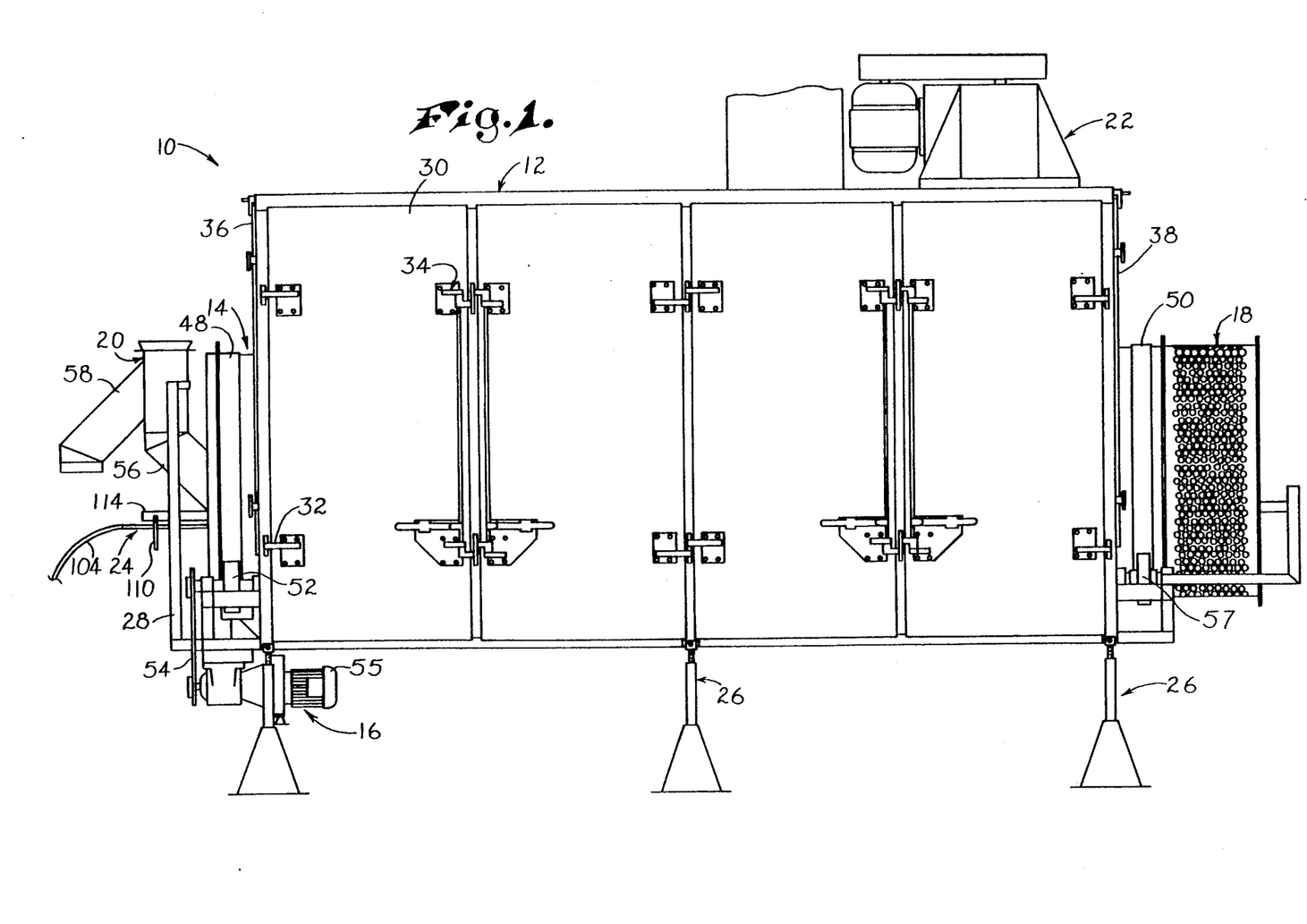
FIG. 1 is a right side elevational view of a combined product coating and drying apparatus in accordance with the present invention, showing the air circulation fan at the top of the housing of the apparatus, the exhaust flue and a product sizing screen at the rear of the apparatus.
Figure 2:
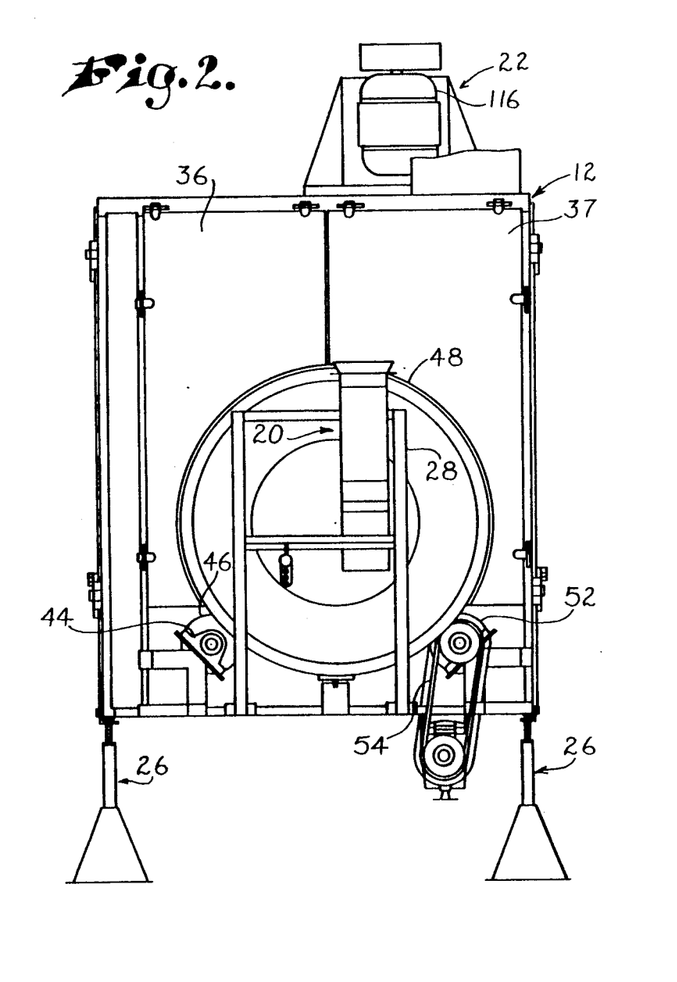
FIG. 2 is a front elevational view of the apparatus hereof, showing the reel drive unit and the product inlet chute.
Figure 3:
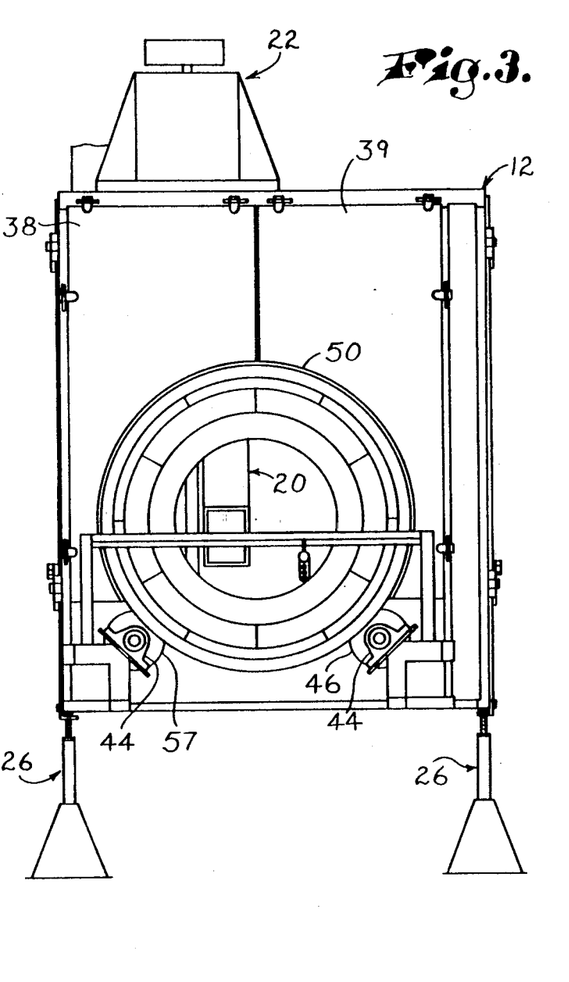
FIG. 3 is a rear elevational view of the apparatus hereof, showing the product sizing screen.
Figures 5, 7, 8:
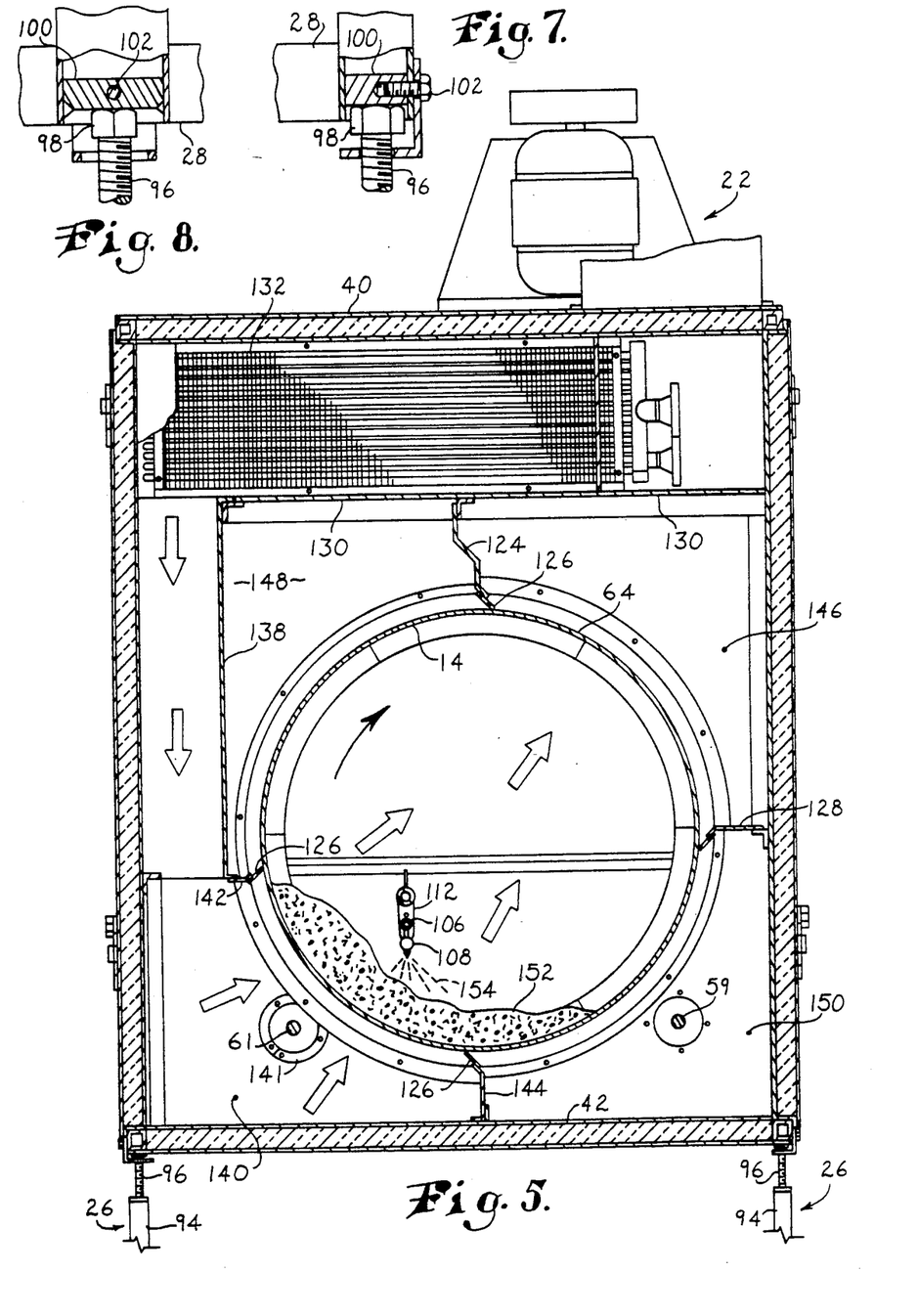
FIG. 5 is an enlarged vertical sectional of the present invention taken transversely through the apparatus showing the heat exchanger and air circulation path through the reel.
FIG. 7 is an enlarged side elevational view in partial cross-section of the frame of the housing showing the pivotal mounting of the support member to the housing for adjusting the angle of inclination of the apparatus hereof.
FIG. 8 is an enlarged end elevational view in partial cross-section showing the mounting for the pivotal support between the frame and the support member.
Figure 6:
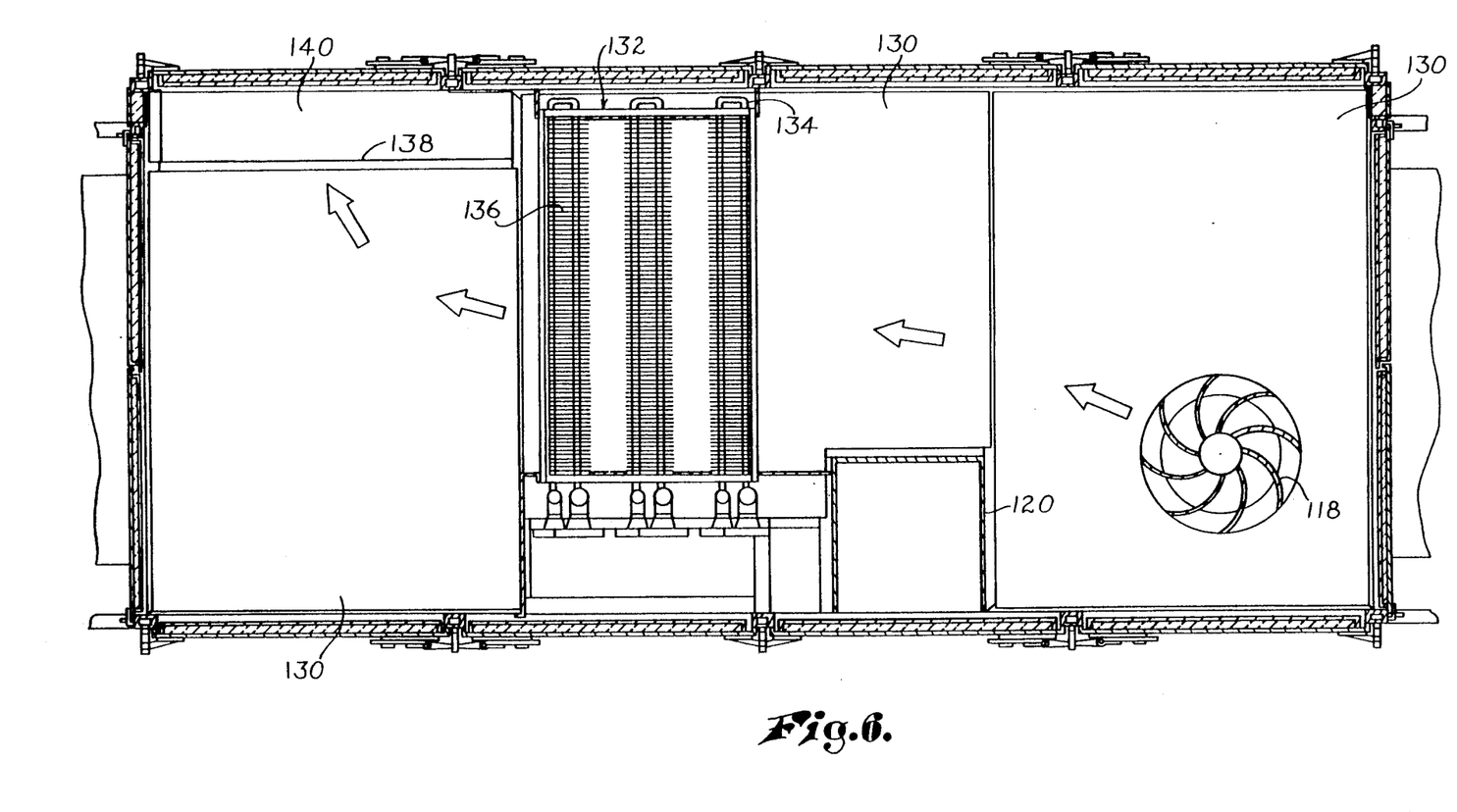
FIG. 6 is a horizontal sectional view of the present invention taken below the roof of the housing to show the impeller of the circulation fan and the heat exchanger.

In greater detail, housing 12 includes a frame 28 which carries a plurality of doors 30 pivotally mounted on hinges 32. The doors 30 are snugly but releasably secured to the frame 28 by hasps 34. As seen in FIGS. 2 and 3, doors 3, doors 36, 37, and 38, 39 located adjacent inlet chute 20 and sizing screen 18 respectively are also mounted to frame 28 by holding clips for fitting closely to reel 14. The housing also includes a roof 40 and a floor 42, as shown in FIG. 5, which aid in defining air passageways for the circulation of drying air within the housing 12.

Referring now to FIGS. 2 and 3 of the drawing, housing 12 carries a plurality of pillow blocks 44 carrying trunnion wheels 46. Trunnion wheels 46 engage respective trunnion rings 48 and 50 circumscribing reel 14. Trunnion wheel 52 is driven by chain 54 of drive mechanism 16 for rotating trunnion ring 48. Motor 55 drives chain 54 through a conventional sprocket engaged with the trunnion wheel 52. The rotational speed of the reel 14 may be varied by substituting a differently sized sprockets or by utilizing a variable speed electric motor 55. A shaft 59 interconnects trunnion wheel 52 with trunnion wheel 57 for driving trunnion ring 50, and a shaft 61 interconnects the two trunnion wheels 46.

Frame 28 supports inlet chute 20 which includes a tube 56 for discharging food product interiorly of the reel 14 and a diversion duct 58 for shunting food product when the reel 14 is inoperative. A diversion plate (not shown) is located interior to the inlet chute 20 at the junction of the tube 56 and the duct 58 for diverting food product into either tube 56 or duct as desired. The inlet chute 20 is positioned upstream of the reel 14 to receive food product from an extruder, storage bin, dryer or other apparatus and convey the product through tube 56 into the reel 14.

Figure 4:
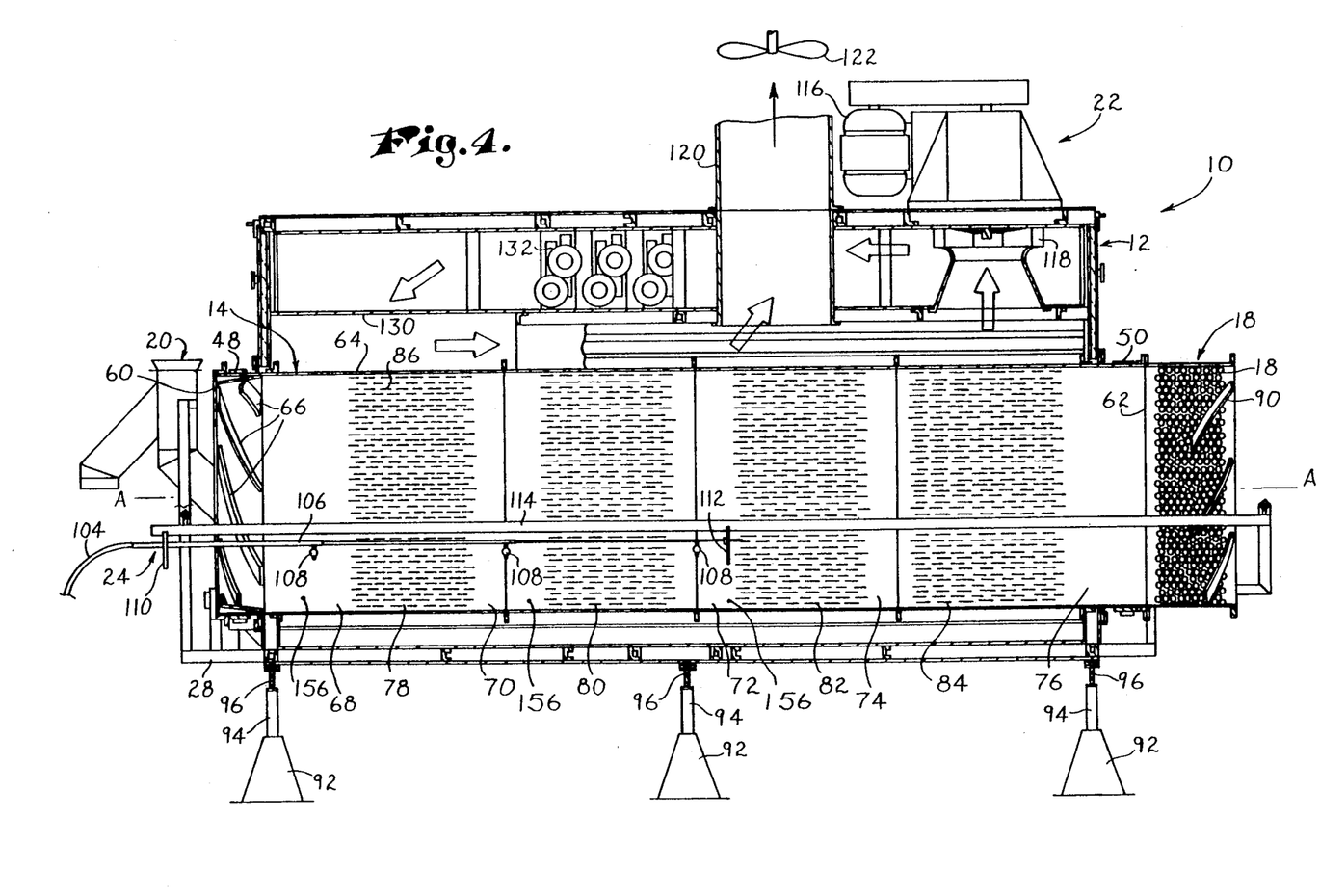
FIG. 4 is a vertical cross-sectional view of the present invention taken longitudinally through the apparatus showing spray and drying zones defined by a rotatable reel, perforations in the sidewall of the reel, spray nozzle located interiorly of the reel, a heat exchanger for heating air circulated by the circulation fan and an exhaust fan shown schematically in communication with the exhaust flue.

Reel 14, best viewed in FIG. 4, is constructed as an elongated cylinder having a longitudinal axis A—A' extending between an inlet end 60, an opposed discharge end 62, and a cylindrical sidewall 64 which carries a plurality of spiral shaped vanes 66. The vanes are evenly spaced along the sidewall 64 adjacent inlet end 60 for moving the food product interiorly of the reel 14 when deposited by the inlet chute 20. As seen in FIG. 4, sidewall 64 presents a series of imperforate sections 68, 70, 72, 74 and 76 which alternate with perforate sections 78, 80, 82 and 84. Each perforate section includes a number of slits 86 in sidewall 64. Sizing screen 18 extends downstream from discharge end 62 and rotates with reel 14. Screen 18 is cylindrical and preferably of a diameter the same as reel 14. Screen 18 includes a number of holes 88 which are somewhat larger than the desired product size but small enough to retain aggregations of coated product. A plurality of spaced-apart retainers 90 which project radially inwardly of the wall of screen 18 in a spiral path. The vanes 66 and retainers 90 are oriented to spiral in opposite directions whereby vanes 66 serve to advance the product into the interior of the reel 14 and retainers 90 serve to retain the oversized aggregations on the screen 18 during rotation of the reel 14.

Housing 12 is supported by three pairs of support members 26. Each support member includes a base 92 and an internally threaded post 94 engaged with threaded rod 96. The rods 96 each extend upwardly to a head 98 which lies in abutment with shelf 100, as best seen in FIGS. 7 and 8. Each shelf 100 is pivotally mounted on pin 102.

Frame 28 also carries spray unit 24 for depositing a pressurized spray of coating material such as a sugar or salt slurry onto the food product passing therethrough. Spray unit 24 is oriented below axis A—A' and offset toward the portion of the sidewall 64 moving upwardly during rotation, as seen in FIG. 5. Spray unit 24 includes a supply line 104 connected to a conduit 106 which supplies the sprayable substance to nozzles 108. The conduit 106 is of decreasing diameter downstream of each nozzle 108 to maintain proper and equal pressure at each nozzle 108 during spraying. Each nozzle 108 is positioned opposite an imperforate portion of the reel as shown in FIG. 4 to minimize spray loss through the slits 86. A pair of hangers 110, 112 support the spray unit 24 from a longitudinally extending rail 114.

Housing 12 cooperates with reel 14 and air circulation unit 22 to provide for the circulation of drying air across the reel 14 and through the product passing therethrough. Air circulation unit 22 includes an electric motor 116 for driving a fan impeller 118. Air circulation unit 22 may be selected for the desired airflow from SQA plug fans manufactured by Chicago Airfoil. An exhaust flue 120 serves to remove moisture-laden air from the apparatus 10 and is provided with an exhaust fan 122 shown schematically in FIG. 4 to ensure positive airflow through the apparatus 10.

The drying air is channeled through apparatus 10 along routes defined by the housing 12 and reel 14. A panel 124 extends longitudinally along housing 12 adjacent reel 14 and is provided with a flexible sealing member 126 which lies in engagement with the sidewall 64 of reel 14. Similarly, ledge 128 extends longitudinally along housing 12 adjacent reel 14 and is also provided with a flexible sealing member 126 lying in engagement with sidewall 64. A series of plates 130 extend horizontally across housing 12 both longitudinally and transversely but are provided with openings to permit air to move up through flue 120 and into air circulation unit 22.

A heat exchanger 132 is located above plate 130 and oriented to receive air from air circulation unit 22. Heat exchanger includes a number of steam coils 134 and fins 136 so that air passing thereacross may be heated during circulation of steam through the coils 134. A channel extends downwardly between the side of the housing 12 and partition 138 whereby heated air is directed into chamber 140. Chamber 140 is enclosed at each end to prevent the escape of the heated air, and sealing ring 141 surrounds a shaft connecting trunnion wheels 46 in substantially airtight relationship. Lips 142 and 144 are provided with sealing members 126 in engagement with reel 14 whereby air is directed through the slits 86 of the perforate sections 78, 80, 82 and 84. A plenum 146 is defined between panel 124 and ledge 128 for receiving air moving through the reel 14 from chamber 140 and from openings in the inlet end 60 and discharge end 62 of the reel 14. Plenum 146 is also substantially enclosed at each end to provide sufficient negative air pressure whereby air passing through the food product from chamber 140 is drawn therein. Void 148 and void 150 have substantially no air movement because of the sealing effects of panel 124, ledge 128 and lips 142 and 144 but may be open at the ends thereof. The roof 40, floor 42 and sides and ends of the housing including doors 30, 36, 37, 38 and 39 are substantially airtight and enclose the housing 12 whereby the positive airflow created by circulating component 22 and exhaust fan 122 cause the air to flow in a substantially closed circuit through the housing except for air drawn in through openings in the inlet end 60 and discharge end 62 and exhausted through flue 120.

In operation, food product 152 which has been processed through an extruder and also possibly a dryer is introduced into the reel 14 of the apparatus through inlet chute 20. The reel 14 is rotated by drive mechanism 16 whereby the trunnion wheels 52 and 57 rotate the reel 14 in a clockwise direction as viewed from inlet end 60 to outlet end 62 shown in FIG. 5. The speed of rotation is preferably between the ranges of 1 to 50 rpm, but may be more dependent on the product to be processed. As the reel 14 rotates, vanes 66 urge the product 152 forward into the interior of the reel 14 and cause it to tumble, thus exposing it to the air circulating through slits 86 as well as air entering through the inlet end 60.

As the product advances beyond vanes 66, it is urged upwardly along sidewall 64 due to the rotation of the reel 14. The product 152 is presented as a tumbling bed as shown in FIG. 5. The reel 14 is adjustably inclined by turning rod 96 relative to post 94. The extent of the angle of inclination of the reel 14 (and thus longitudinal axis A—A'), as well as the speed of rotation of the reel 14 affect the residence time of the product 152 within the reel 14. Rotation of the reel 14 causes the product to move upwardly during rotation until it reaches a level of instability, then fall vertically to a new position of stability. Because the reel 14 is inclined, the product 152 will move longitudinally forward along the reel 14 during each fall.

Air is circulated through the slits 86 in each of the perforate sections 78, 80, 82 and 84 of the sidewall 64 of the reel 14. As shown in FIG. 5, air is drawn upwardly through the slits 86 into plenum 146. A portion of the air in plenum 146 is exhausted through flue 120 while the remainder is drawn upwardly by the rotation of impeller 118 and moved between plates 130 and roof 40 past heat exchanger 132. Steam circulated within steam coils and supplied by an outside source heats the air supplied by impeller 118.

Alternatively, according to the desires of the user and the availability of alternate energy sources, open gas-fired burners could be employed to directly heat the circulating air. The use of open burners would permit increased products rates. In addition, indirect heaters could be employed to hear air to be circulated through the heat exchanger, as local conditions dictate. The heated air then moves downwardly along partition 138 into chamber 140. The air is under pressure and is expelled through slits 86 into the tumbling bed of product 152. As the heated air passes through the product 152 it absorbs moisture. The air passing through the product 152 into the interior of the reel 14 is then drawn upwardly along with ambient air pulled in from each the inlet and discharge ends through slits 86 in the side of the reel 14 then opposite chamber 140 and into plenum 146.

The food product is sprayed with a coating substance 154 in spray zones 156 defined by each spray nozzle 108 and the imperforate sections 68, 70 and 72 opposite the spray nozzles 108. As shown in FIG. 5, the food product 152 such as breakfast cereal may be exposed to spraying of a slurry including sugar and water whereby the cereal may be provided with a thin sugar coating. The agitation of the cereal prevents the individual flakes, spheres, "O's" or other shapes of individual product from sticking together. The product is tumbled by the action of the rotating reel 14 until it reaches the next adjacent perforate section 78, 80 or 82 where moisture in the product or applied during the spray may be removed and the coating dried. Through this method, successive applications of spray may be applied and then dried enabling a uniform coating of the product with a minimum of added moisture. It may be appreciated that a variety of different food products including for example puffed cheese snacks or dog food might be coated with seasonings or salt in hydrous slurry solutions in accordance with the same method.

After the food product 152 traverses the length of the reel 14 it reaches sizing screen 18. A hopper, conveyor or bin may be placed beneath the sizing screen 18 to receive normal product which falls through the holes 88 therein. Oversized product is further agitated and retained on sizing screen 18 by the retainers 90 which prevent the oversized product from falling out the open end thereof.

It has been determined that product received by the apparatus 10 hereof may have a moisture content of up to 2.9% by weight and still be discharged through the sizing screen 18 with a moisture content of 2.9% by weight which is satisfactory for storage. The slurry solution applied through spray unit 24 is preferably of a moisture content of 40% to 60% by weight, but may have a moisture content as high as about 80% solids and 20% water by weight. The present apparatus enables this high solid solution to be sprayed and dried on the product to yield an additional 150 kg or more of solid coating substance to be added by applying 180 kg of slurry containing the desired coating substance and removing the 30 kg of moisture. The angle of longitudinal axis A—A' may be adjusted from the vertical to provide the desired residence time of the product in the apparatus 10 according to the type of base product and the type and moisture content of coating substance slurry which is applied. When applying sugar coating to cereal products, the residence time is ordinarily in the range of about 3 minutes to 20 minutes and preferably about 5 minutes. The temperature of the air circulated through the product when measured in chamber 140 just prior to passage through the food product 152 is in the range of 150° F. to 300° F. and preferably about 200° F., dependent upon the particular product and rate of production.

The resulting product has been found to be uniformly coated even for difficult shapes such as toroids wherein the inner facing surface is evenly coated with the outer surface. Yet further, runs through the apparatus 10 have produced product having no aggregations of individual product, even with sticky product such as sugar-coated cereal. The ability to apply multiple thin coats has meant that the product entering the apparatus has not been dried to below target moisture level to compensate for the absorption of moisture ordinarily retained by the base product through conventional coating methods.

We claim:

1. An apparatus for coating and drying a food product comprising:
    a dryer housing;
    an elongated reel presenting a longitudinal axis and having an inlet, an outlet, and a sidewall defining an interior and presenting a plurality of perforations, said side wall being located substantially within said housing whereby said perforations are surrounded by said housing;
    means for introducing the product into the interior of said reel through said inlet;
    means for rotating said reel within said housing;
    means for selectively inclining said reel with said inlet elevated relative to said outlet;
    air circulating means associated with said dryer housing for circulating air through said reel, the air circulating means including means for drawing air from the interior of the reel into said housing in order to provide positive air flow through the apparatus; and
    means defining a plurality of separate product coating zones longitudinally spaced along said reel, each of said zones including at least one spray nozzle directed toward said sidewall for pressurized spraying of a coating on the food product during passage of said food product from said inlet to said outlet.

2. An apparatus for coating and drying a food product as set forth in claim 1 including structure associated with said housing defining a plenum therein for receiving said air passing through said perforations from the interior of said reel.

3. An apparatus for coating and drying a food product as set forth in claim 2 including means for exhausting a first portion of said air received in said plenum and recirculating a second portion of said air back into the interior of said reel.

4. An apparatus as set forth in claim 3 including means within said housing for heating said air.

5. An apparatus for coating and drying a food product as set forth in claims 4, wherein said heating means comprises a heat exchanger.

6. An apparatus for coating and drying a food product as set forth in claim 3 including means associated with said product inlet and said product outlet for admitting air therethrough into the interior of said reel.

7. A method of drying and coating a food product comprising the steps of:
    introducing the product through an inlet into the interior of a food dryer and coating apparatus having a rotatable reel presenting a sidewall defining said interior and including a plurality of perforations therein;
    rotating said reel to advance said food product longitudinally along the interior of said reel;
    spraying a liquid coating substance onto said food product during rotation of said reel;
    circulating heated air through said reel and the food product passing through the interior of the reel;
    introducing a flow of ambient air into the interior of the reel;
    combining said heated air and said ambient air and recirculating a first portion of said combined air to an air heater for reintroduction through said perforations and exhausting a second portion of said combined air;
    drying said coating substance on the product in the interior of said reel; and
    discharging the coated product through an outlet.

8. A method as set forth in claim 7 wherein said food product is continuously agitated from its introduction into said inlet until its discharge from said outlet.

* * * * *

(12) REEXAMINATION CERTIFICATE (4563rd)

United States Patent
Singer et al.

(10) Number: US 5,100,683 C1
(45) Certificate Issued: Apr. 30, 2002

(54) METHOD AND APPARATUS FOR COMBINED PRODUCT COATING AND DRYING

(75) Inventors: Roy E. Singer, Crystal, MN (US); Gerald E. Schmelzle, Sabetha, KS (US)

(73) Assignee: Wenger Manufacturing, Inc., Sabetha, KS (US)

Reexamination Request:
No. 90/006,011, May 18, 2001

Reexamination Certificate for:
Patent No.: 5,100,683
Issued: Mar. 31, 1992
Appl. No.: 07/658,710
Filed: Feb. 21, 1991

(51) Int. Cl.$^7$ ............... A23B 4/10; A23G 3/26; A23G 3/00; B05B 7/14; B05B 7/16; B05C 5/00; F26B 11/00

(52) U.S. Cl. ............ 426/302; 426/304; 426/305; 118/19; 118/20; 118/303

(58) Field of Search ................. 426/302, 304, 426/305; 118/16, 19, 20, 24, 303, 23

(56) References Cited

U.S. PATENT DOCUMENTS

| | | | | |
|---|---|---|---|---|
| 3,101,040 A | * | 8/1963 | Lanz | 99/235 |
| 3,934,545 A | * | 1/1976 | Schady | 118/19 |
| 4,639,383 A | * | 1/1987 | Casey | 427/213 |

FOREIGN PATENT DOCUMENTS

FR 2502466 A * 10/1982

* cited by examiner

Primary Examiner—Keith D. Hendricks (57) ABSTRACT

An apparatus for drying and coating a food product is provided which enables a uniform coating to be sprayed on the product without adversely affecting the product moisture content. The apparatus includes a reel which includes at least one and preferably a series of perforate zones in the sidewall for circulating air around the product during passage of the product therealong. Spray nozzles are arranged at intervals along the reel to deposit sugar, salt or other food coatings in slurry form on the food product. The reel rotates during coating and drying of the product to prevent aggregation of the individual food products and uneven coating, as well as providing for uniform drying of the coated product. The invention includes a method of drying and coating a food product including the steps of introducing the food product into a reel inlet, rotating the reel and circulating air therethrough, applying a coating to the product during rotation of the reel and drying the coating on the product before discharging the coated product from the dryer.

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–8 is confirmed.

\* \* \* \* \*